Patented Apr. 15, 1947

2,418,981

UNITED STATES PATENT OFFICE 2,418,981

METHOD OF PRODUCING TANNING MATERIALS FROM WASTE SULFITE LIQUOR

Oskar A. Müller, Zurich, Switzerland

No Drawing. Application December 16, 1943, Serial No. 514,565. In Switzerland January 28, 1942

3 Claims. (Cl. 260—124)

This invention relates to a method of producing tanning materials and has for its object to transform the sulpho-lignic acid or the salts thereof contained in sulphite waste lye to tanning materials which can be precipitated by means of gelatine and heavy-metal salts and which yield coloring effects in combination with iron salts.

The method according to the invention consists in chlorinating the sulpho-lignic acid and again wholly or at least partly eliminating the chlorine which has been compounded, by a simultaneous or subsequent alkaline treatment.

As a result of the treatment of the chlorinated sulpho-lignic acid with alkaline or alkaline earth hydroxides, hydroxyl groups, partly of phenolic character, are introduced into the lignine molecule whereby the tanning nature of the sulpho-lignic acid is initially brought about.

It is, admittedly, already known to derive lignic chlorides having tanning properties from sulphite cellulose waste lye in that this waste lye is chlorinated until a lignic chloride of a chlorine content of about 30% precipitates which is intended to be used for tanning purposes after being separated by a salt. It has however not yet become common knowledge that such lignic chlorides can be transformed into products that are free from chlorine and enriched in hydroxyl by an alkaline treatment so as to increase the tanning properties of such products in substantial manner.

It is further known to impart tanning properties to the waste lye of sulphite cellulose by treating the waste lye with alkaline earth hydroxides. The chemical reaction takes, however, an accordingly different course than if chlorinated sulphite cellulose waste lye is subjected to an alkaline treatment, which is manifest also by the fact that these alkaline earthy reaction products are still soluble in water whereas those previously referred to are no longer soluble.

According to the present method the waste lye is treated with a substantially smaller amount of chlorine than would be required for precipitating the lignic chloride. The precipitation of lignic chloride begins only, for example, if an amount of chlorine of over 50% of the organic substance contained in the waste lye is added, in contradistinction to the present method in which chlorination up to about 20% of the organic substance suffices to isolate afterwards the whole tanning product as calcium salt. In this respect it must be taken into consideration that in chlorinating in this way more than ⅔ of the chlorine used is always transformed into hydrochloric acid. The simultaneous or subsequent alkaline treatment of the present method is for the purpose of eliminating the organically combined chlorine atoms, which takes place immediately by exothermic reaction.

For carrying the method into effect, advantageously, a sulphite cellulose waste lye is used which on the one hand has been dealcoholised by fermentation and distillation by any suitable known method and on the other hand has been freed also from non-compounded or loosely compounded sulphurous acid by any such method. In using the present method this pretreatment is not absolutely necessary but sometimes desirable for economical reasons.

A thus pretreated waste lye can either be transformed in a lye, being free from calcium and iron in known manner, by means of soda, which on being concentrated is, advantageously, subjected to chlorination and further treated simultaneously or subsequently in accordance with the present method by addition of alkaline hydroxide, whereby a concentrated tanning extract is obtained directly. Or the sulphite cellulose waste lye which may have been pretreated can be chlorinated directly in diluted condition and be treated simultaneously or subsequently with such an amount of alkaline earth hydroxide, preferably calcium hydroxide, that the solution, upon the addition of the required amount of chlorine, still has a slightly alkaline reaction, whereby the tannic acid precipitates as a difficultly soluble calcium salt.

The calcium salt thus precipitated is not identical with that which is obtained if sulphite cellulose waste lye is treated with calcium hydroxide without subjection to chlorination. The solubility of this salt is considerably smaller than that of the latter and the yield is correspondingly greater. The free tanning substances obtained therefrom have the properties of a genuine vegetable tanning material in presence of gelatine and heavy-metal salts as distinct from products obtained from calcium precipitate not having been chlorinated.

Example 1

Fermented and dealcoholised sulphite cellulose waste lye is treated with soda in a known manner and the decanted or filtered out solution being free from calcium and iron is condensed to approximately 30° Bé. and the yield of sulpho-lignic sodium is treated with chlorine gas up to the desired pH-value of the tanning solution, if desired, by addition of a corresponding amount of caustic soda. The amount of chlorine to be added varies between about 10 to 30% of the organic substance contained in the solution to be chlorinated. Chlorinated products do not separate out and the extract obtained can be used itself for tanning directly or in combination with conventional tanning materials of widely varying chemical composition.

*Example 2*

Fermented and dealcoholised waste lye of, for example, 5 to 10% dryness is reacted with such an amount of calcium hydroxide and, if desired, with a precipitating substance for iron, such as sodium sulfide, advantageously, at elevated temperature that the content of free and partially compounded sulphurous acid and iron is precipitated. Thereupon the solution is separated from the precipitate in any suitable known manner and subjected to chlorination. The amount of chlorine to be added is 10 to 30% of the content of organic substance. Afterwards or during or even prior to the chlorination such an amount of calcium hydroxide is added that the solution on the termination of the interaction still has a slightly alkaline reaction. The precipitate of calcium salt of the tanning products are isolated, washed out and treated with sulphuric acid or alkaline salts thereof, whereby the calcium content is precipitated in the form of gypsum. After the latter has been separated out, advantageously, by means of oxalic acid or alkaline salts thereof, also the residues of calcium still present are separated. Thereupon, the extract can be used singly or in combination with tanning materials of known kind, if desired, after having been further condensed into eventual powdered state.

I claim:

1. The method of producing tanning materials substantially free from chlorine, comprising the steps of treating sulphite cellulose waste lye containing organic material with chlorine in an amount of 10 to 30% of the dry content of organic material present in the lye so that no precipitation of chlorinated product occurs, and hydrolyzing the chlorinated material by heating with an alkaline hydroxide until substantially the whole organically combined chlorine is eliminated again.

2. The method of producing tanning materials by chlorination of concentrated sulphite waste lye which is free from calcium comprising, treating sulphite waste lye with chlorine in the amount of about 10 to 30% of the dry content of organic substances present in the lye, and treating the lye with an alkaline hydroxide until the organically combined chlorine is eliminated again.

3. The method of producing tanning materials by chlorination of nonconcentrated sulphite waste lye comprising, treating sulphite waste lye with chlorine in the amount of about 10 to 30% of the dry content of organic substances present in the lye, and treating the lye with calcium hydroxide, whereby the calcium salts of the tanning product are precipitated and isolated.

OSKAR A. MÜLLER.

REFERENCES CITED

The following references are of record in the file of this patent:

UNITED STATES PATENTS

| Number | Name | Date |
|---|---|---|
| 2,244,410 | Wallace | June 3, 1941 |
| 1,567,395 | Schmidt | Dec. 29, 1925 |
| 1,130,817 | Hedden | Mar. 9, 1915 |

FOREIGN PATENTS

| Number | Country | Date |
|---|---|---|
| 542,027 | French | May 11, 1922 |
| 459,617 | German | May 5, 1928 |
| 401,871 | German | Sept. 10, 1924 |
| 516,959 | French | Dec. 11, 1920 |